(12) United States Patent
Powrie et al.

(10) Patent No.: US 6,383,546 B1
(45) Date of Patent: May 7, 2002

(54) FORMULATION AND PROCESS FOR PRODUCING A UNIVERSAL FRUIT BASE FOR USE IN PREPARING NON-SETTLING, CREAMY, SMOOTH, FRUIT BEVERAGES

(75) Inventors: William Duncan Powrie, North Vancouver; Michel Facon, Vancouver; Perry Lidster, Chilliwack, all of (CA)

(73) Assignee: Pacific Rim Marketing Limited, Vancouver (CA)

( * ) Notice: Subject to any disclaimer, the term of this patent is extended or adjusted under 35 U.S.C. 154(b) by 0 days.

(21) Appl. No.: 09/569,866

(22) Filed: May 12, 2000

(51) Int. Cl.[7] .................. A23L 1/0522; A23L 1/054; A23L 1/064; A23L 2/02
(52) U.S. Cl. .................. 426/599; 426/508; 426/510; 426/518; 426/573; 426/578; 426/615
(58) Field of Search .................. 426/599, 508, 426/510, 518, 573, 578, 615

(56) References Cited

U.S. PATENT DOCUMENTS

| | | |
|---|---|---|
| 3,737,324 A | 6/1973 | Zinchenko et al. |
| 3,892,877 A | 7/1975 | Wagner et al. |
| 3,976,805 A | 8/1976 | Becker |
| 4,089,985 A | 5/1978 | Wolff |
| 4,163,807 A | 8/1979 | Jackman |
| 4,235,936 A * | 11/1980 | Kahn et al. .................. 426/599 |
| 4,433,000 A | 2/1984 | De Leon et al. |
| 4,609,561 A * | 9/1986 | Wade et al. .................. 426/565 |
| 4,737,367 A | 4/1988 | Langer et al. |
| 4,828,866 A * | 5/1989 | Wade et al. .................. 426/599 |
| 4,919,963 A | 4/1990 | Heckert |
| 4,988,530 A | 1/1991 | Hoersten et al. |
| 5,096,719 A | 3/1992 | Gresch |
| 5,244,684 A | 9/1993 | Tong et al. |
| 5,248,515 A * | 9/1993 | Payton et al. .................. 426/599 |
| 5,275,834 A | 1/1994 | Thibault et al. |
| 5,385,748 A | 1/1995 | Bunger et al. |
| 5,731,018 A | 3/1998 | Janda et al. |
| 5,756,141 A | 5/1998 | Chen et al. |

(List continued on next page.)

FOREIGN PATENT DOCUMENTS

CA  2098117  5/1993

OTHER PUBLICATIONS

Powrie and Tung, "Food Dispersions", Principles of Food Science, Part 1, Food Chemistry. Marcel Dekker Inc. 1966, p. 539

Rha, "Rheology of Fluid Foods", Food Technol. Jul. 77. 1978.

Kokini, "Fluid and Semi–Solid Food Texture and Texture–Taste Interactions", Food Technol. Nov. 86. 1985.

*Primary Examiner*—Helen Pratt
(74) *Attorney, Agent, or Firm*—Oyen Wiggs Green & Mutala

(57) ABSTRACT

The invention pertains to the formulation and process for producing a universal fruit base, which is an apple mash-polysaccharide mixture to which fruit puree(s) and optionally concentrated fruit juice(s) are to be added to form beverage concentrates. The beverage concentrates are to be diluted with water and/or fruit juice(s) to create supreme, distinctive, refreshing, healthy, creamy, smooth, thick, non-gummy and non-settling fruit beverages (smoothies). The resulting beverages possess hydrated cellular particulates, which are stabilized by modified starch and xanthan gum and thus sedimentation of particulates does not occur during the storage of the resulting beverages. Homogenization is not required for particulate stabilization. Pasteurization and sterilization of the resulting beverages can be carried out without the loss of textural and flavour quality attributes and without particulate destabilization and sedimentation. A wide variety of ingredients such as protein foods, coffee, tea, cocoa, nutrients, natural and artificial flavours, sweeteners and botanicals may be added for flavour, nutritional and health appeal.

17 Claims, 1 Drawing Sheet

U.S. PATENT DOCUMENTS

Figure 1:
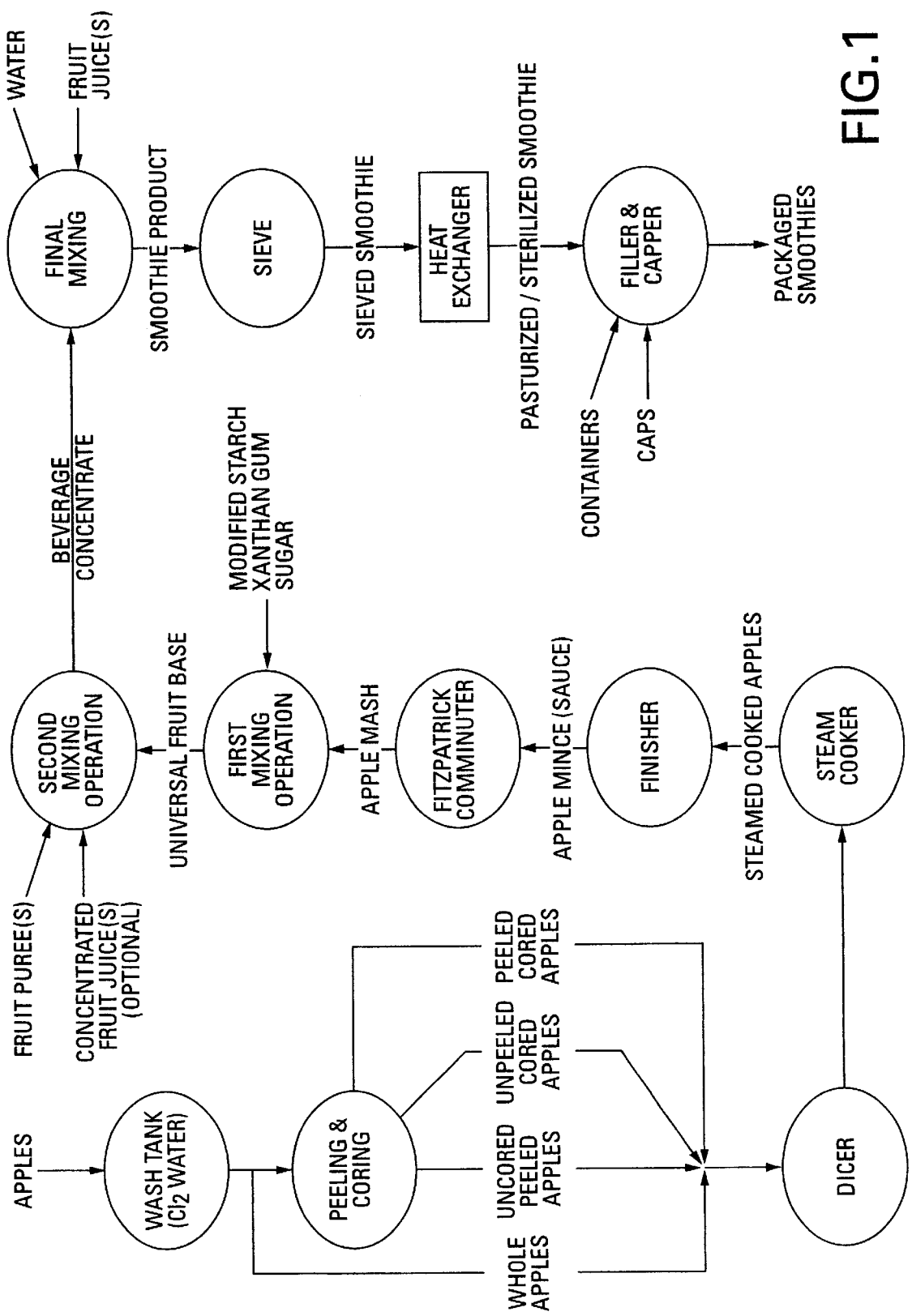

| | | |
|---|---|---|
| 5,807,603 A | 9/1998 | Lerchenfeld et al. |
| 5,849,350 A | 12/1998 | Ashourian |
| 5,869,122 A | 2/1999 | McCarthy |
| 5,879,737 A | 3/1999 | Ashourian |
| 5,922,374 A | 7/1999 | Daury et al. |
| 5,965,190 A | 10/1999 | Gallaher et al. |
| 6,004,610 A | 12/1999 | Wang et al. |
| 6,020,018 A | 2/2000 | Tong et al. |
| 6,054,169 A | 4/2000 | Gauthie-Jaques et al. |
| 6,106,874 A | 8/2000 | Liebrecht et al. |

* cited by examiner

US 6,383,546 B1

FORMULATION AND PROCESS FOR PRODUCING A UNIVERSAL FRUIT BASE FOR USE IN PREPARING NON-SETTLING, CREAMY, SMOOTH, FRUIT BEVERAGES

FIELD OF THE INVENTION

This invention relates to a novel universal fruit base for a fruit beverage and a process of producing the novel fruit base and beverage. More specifically, the invention relates to a novel formulation and process for producing a universal fruit base to be used for preparing non-settling, creamy, smooth, thick fruit beverages.

BACKGROUND OF THE INVENTION

Studies have indicated that diets high in fruits and vegetables can be correlated with lower risks of cancer and heart disease in humans. Nutritionists are recommending an increase in the consumption of fruits and vegetables in order to impede or prevent the incidence of chronic diseases and to supply adequate amounts of vital nutrients, fibre and antioxidants for maintaining healthy bodies.

The beneficial effects of ingested fruits may be attributed to the presence of ascorbic acid, carotenoids, minerals, fibre, and antioxidants such as phenolic compounds and anthocyanins. During the conversion of fruit into fruit juice, some of these valuable compounds may be retained in the pulpy waste residue. Thus beverages with pureed whole fruits would be advisable to ensure nutrient retention and superior fruit flavour.

Several problems have been encountered in the production of beverages with pureed whole fruits as ingredients. In the first place, fruit particles of the purees tend to settle during the storage of the beverages. Homogenization of such fruit beverages has been considered as a process operation for reducing the rate of settling. Secondly, the fruit puree particles with irregular shapes are responsible for a pulpy, fibrous texture of the fruit beverages with an accompanying reduction in smoothness.

A number of U.S. patents have been issued for fruit related beverages:

U.S. Pat. No. 5,879,737 to Ashourian, issued on Mar. 9, 1999, discloses a process for producing a shelf-stable, pourable fruit product from fresh and processed fruits, fruit purees and fruit juices. The product is produced by the fragmentation of intact fruit cells by homogenization of fruit puree-fruit juice mixtures. More than 61% of the intact fruit cells are to be fragmented during homogenization to form small cell fragments. The resulting products are to be pourable, spreadable, shelf-stable, and free of sedimentation for six months. The use of the fruit product as an ingredient for a beverage was not mentioned. This process does not produce predominantly intact single cells and does not disclose stabilizing the intact cells with modified starch and xanthan gum.

U.S. Pat. No. 5,248,515 to Payton et al., issued Sep. 28, 1993, discloses a process for preparing a vegetable fine-grind puree to which a fruit juice is added with the resulting beverage having a vegetable solids content of from about 1% to about 4% by weight of the product. The process comprises of comminution of cooked vegetables so that the particles of the puree can pass through a 80-mesh screen. The puree-fruit juice mixture is to be homogenized.

U.S. Pat. No. 5,096,719 to Gresch, issued on Mar. 17, 1992, discloses a process for extraction of juice from fruits and vegetables. The raw material is crushed in a mill, fed into a pulper and then onto a membrane filtration unit. The cell-containing retentate is exposed to enzymic treatment or physical treatment to breakdown the cells as a liquefaction step.

U.S. Pat. No. 4,089,985 to Wolff, issued on May 16, 1978, discloses a process in which fresh papaya meat with any of a variety of combinations of water, sugar, honey, citric acid, lemon juice, and ascorbic acid are placed in a high speed blender for homogenization at about 91° C. The foam created during the homogenization of the papaya meat must be removed prior to the packaging of the juice.

U.S. Pat. No. 5,807,603 to Lerchenfeld et al., issued on Sep. 15, 1998, discloses a method and stabilizer system for preventing the separation of solids in juice-containing products. Propylene glycol alginate and sodium carboxymethylcellulose are blended with hot water to form a slurry which is to be added to a fruit concentrate. Prior to reconstitution with water, the slurry-concentrate is to be homogenized.

U.S. Pat. No. 4,163,807 to Jackinan, issued on Aug. 7, 1979, discloses a method of improving the appearance, taste and stability of citrus fruit juice and drinks by incorporating xanthan gum and carboxymethylcellulose. In particular, the combined gums unproved the suspension of the pulp in the citrus juice and drinks during storage up to 7 days. The addition of xanthan gum alone to the beverages was found to bring about cloud destabilization and pulp flocculation.

U.S. Pat. No. 4,988,530 to Hoersten et al., issued on Jan. 29, 1991, discloses a method for introducing a soluble dietary fibre supplement into fruit juices. The soluble fibre components are gum arabic and pectin having a degree of esterification of at least 50% with sufficient levels to provide a fibre level of at least 2 grams per 8 fluid ounce product. For solubilization of the dietary fibre components, 10 to 20% of the beverage liquid is heated to 80 to 85° C. whereupon the components are added and blended under high shear. A study with either guar gum, xanthan gum or catboxymethylcellulose as a dietary fibre component in apple juice indicated that all of the gums introduced an undesirable mouthfeel. The xanthan-containing juice possessed an undesirable thick, short, stringy consistency.

U.S. Pat. No. 3,976,805 to Becker, issued on Aug. 24, 1976, discloses a method for the preparation of high-consistency tomato products by applying acidification and homogenization to juices or concentrates. To the heat-treated extracted tomato juice at 150 to 212° F. is added with mixing an acid to bring he pH below 3.0. After cooling, juice is restored to natural pH with an alkaline material and homogenized to damage extensively the fruit cells in the juice in order to increase the consistency of the juice.

U.S. Pat. No. 4,737,367 to Langer et al., issued on Apr. 12, 1988, is directed to a fruit-flavoured beverage which is predominantly a mixture of citrus fruit juice (at least half as orange juice) and tropical fruit juice (at least half as pineapple juice) and having high concentrations of vitamins to satisfy the recommended daily allowance of vitamins in a single serving of a drink. The mixture of citrus fruit juices and tropical fruit juices in proportions described in the invention mask the unpalatable taste of added vitamins. Individually, apricot, peach and banana purees as well as grape, apple and pear juices do not mask the undesirable taste of the vitamins.

SUMMARY OF THE INVENTION

This invention pertains to a sequential series of process operations involving high temperature treatment of fresh apple pieces and mechanical impaction and screening of the thermally-treated apple pieces to disjoin small, cellular particulates and to release water-dispersible pectin. When the cellular particulates are stabilized by specified polysaccharides, a matrix, described herein as a universal fruit base, is formed. The universal fruit base possesses desirable functional properties, such as smoothness and creaminess, which carry through to resulting beverages called smoothies, made from the universal fruit base and other compositions.

The invention pertains to a formulation and process for producing a universal fruit base., which is an apple mash-polysaccharide mixture to which fruit puree(s) and optionally concentrated fruit juice(s) can be added to form beverage concentrates. The beverage concentrates can be diluted with water and/or fruit juice(s) to create supreme, distinctive, refreshing, healthy, creamy, smooth, thick, non-gummy and non-separating fruit beverages (smoothies). The resulting beverages possess hydrated cellular particulates, which are stabilized by modified starch and xanthan gum. Sedimentation of particulates in the beverages does not occur during the storage of the resulting beverages. Homogenization is not required for particulate stabilization. Pasteurization and sterilization of the resulting beverages can be carried out without the loss of textural and flavour quality attributes and without particulate destabilization and sedimentation. A wide variety of ingredients such as protein foods, coffee, tea, cocoa, nutrients, natural and artificial flavours, sweeteners and botanicals may be added to the beverages for flavour, nutritional and health appeal.

The invention is directed to a process of producing a universal fruit base from apples which comprises: (a) washing and sanitizing the fruit; (b) cutting the apples into pieces; (c) steaming and cooking the apple pieces; (d) macerating and screening the steamed, cooked apple pieces to produce an apple mince; (e) comminuting the apple mince to form a mash having predominantly intact single cells; (f) adding a modified starch and a natural xanthan gum to the fruit mash.

The fruit is to be apple. The apple can be washed and sanitized with chlorinated water or other types of disinfected waters. The apple can be cooked with steam to a temperature of at least 100° C. Steam of a temperature between 100° C. and 110° C. can be used to cook the apple until protopectin in the apple is predominantly solubilized and the tissue becomes suitably soft.

The high temperature treatment of the apple pieces can break down the water-insoluble protopectin in the middle lamellae of the apple tissue to water-dispersible pectins, can inactivate polyphenol oxidase in the apple for the prevention of enzymic browning, can inactivate other oxidases in the apple to inhibit the oxidation of ascorbic acid, can gelatinize the protoplasts in the apple to bring about elastic, semi-solid masses in the intact apple cells, can plasticize the apple cell walls to enhance extensibility and resistance to impact fractures, and can expose the adhesive surfaces of intact apple cells.

The maceration and screening of steamed, cooked apple pieces can be performed by a finisher/pulper to form an apple mince.

The apple mince can be passed through a comminutor to produce an apple mash with a predominance of intact single cells along with some small cellular aggregates.

Pregelatinized cross-linked high amylopectin maize starch (modified starch) can be added apple mash to increase the viscosity as well as increase the smoothness and creaminess. Xanthan gum can be added to interact with the cellular particulates and to increase the viscosity of the continuous phase to restrict particulate sedimentation during the storage of smoothies.

Screen openings (round) in the finisher/pulper can be between about 0.05 and 0.13 inches. Screen openings (round) in the comminutor can be between about 0.033 and 0.093 inches.

The total amount of wet particulate mass for the apple mash can be between 35 and 75% by weight, preferably between 45 to 75% by weight. The amount of pregelatinized cross-linked high amylopectin maize starch (modified starch) added to the apple mash can be between 1.0 and 3.0% by weight, preferably between 1.2 and 2.0% by weight. The amount of xanthan gum added to the apple mash can be between 0.14 and 0.40% by weight, preferably between 0.20 and 0.30% by weight.

Fruit puree(s), and optionally, concentrated fruit juice(s) can be added to the universal fruit base to form a beverage concentrate.

The invention is also directed to a universal fruit base produced according to the process.

The total amount of wet particulate mass for apple mash can be between 35 and 75% by weight, preferably between 45 and 75% by weight.

The amount of pregelatinized cross-linked high amylopectin maize starch added to the apple mash can be between 1.0 and 3.0% by weight. The amount of xanthan gum added to the apple mash can be between 0.14 and 0.40% by weight.

DRAWINGS

In drawings which illustrate specific embodiments of the invention, but which should not be construed as restricting the spirit or scope of the invention in any way:

FIG. 1 illustrates a schematic flow sheet of the process of the invention.

DETAILED DESCRIPTION OF THE INVENTION

Studies have indicated that diets high in fruits and vegetables appear to have a relationship with a lower risk of incidence of cancer and heart disease in the persons who practice such diets. The beneficial health effects of ingested fruits may be attributed to the presence of ascorbic acid, carotenoids, minerals, fibre, and antioxidants such as phenolic compounds and anthocyanins. During the conversion of fruit into fruit juice, some of these valuable compounds may be retained in the pulpy waste residue, which is often filtered from the juice before packaging for consumer consumption. Thus beverages with macerated whole fruits are advisable to ensure nutrient retention and superior fruit flavour.

Within the last few decades, fast food outlets have offered thick, smooth, foamy beverages, called "smoothies", which consist of blended fresh fruits in fruit juice with or without yogurt, soy milk and/or ice. These smoothies, which are consumed soon after preparation before the fruit particles settle and the foam is lost, are convenient for including fruit in the diet.

Bottled smoothies, marketed in retail stores, are produced generally by combining fruit purees with fruit juices. Yogurt or soy milk may be included for improving the nutritional value. Frequently, smoothies are pasteurized or sterilized prior to packaging. Since many types of fruit purees have particles, which are relatively large, irregularly shaped and fibrous, and possess low water-binding capacity, sedimentation or settling of these particles in smoothies occurs during short-time storage. Further, such smoothies are not creamy and often have a grainy, pulpy, fibrous, mouthfeel. Although homogenization of a smoothie may retard sedimentation of the fruit particles, this process operation is costly, causes a considerable drop in viscosity thereby detracting from the appeal of the smoothie, does not create creaminess and may be effective only for short-term storage of the beverage.

There are many types of bottled fruit smoothie products that are available in the market place. These smoothie products have levels of fruit juices and purees ranging from 15% to 100%. Some smoothies with low levels of fruit purees and juices contain gums to increase the viscosity and reduce particle sedimentation, but this gives them a watery, gummy texture. Others, with high levels of fruit juices and purees, have a tendency for the fruit particles to settle and have a pulpy, fibrous texture, which is considered to be undesirable by many consumers. The ideal smoothie has a creamy, smooth and thick consistency and a creamy appearance. These characteristics; are lacking as a totality in commercially-available bottled smoothies.

To be successful in the marketplace, smoothies must be formulated to satisfy the desires and expectations of the target consumers. A smoothie should have built-in structure-function relationships in order to elicit from the consumer highly desirable sensations such as refreshing, creaminess, smoothness and thickness. A refreshing fruit beverage is subconsciously conceived by consumers as having rapid-response taste sensations (sweetness, sourness, bitterness), rich fruity flavour and product clearance of the oral cavity, particularly the tongue, after a limited lingering time. Creaminess, smoothness and thickness as textural sensations of a fruit beverage are dependent on the size, shape, number and interaction of dispersed particles in the continuous phase. Creaminess is perceived when globular-like elastic particles of a beverage move slowly along the upper surface of the tongue without appreciable adherence. Furthermore, thickness and smoothness are contributing factors to the creaminess image of a food product. The higher the concentration of dispersed curved-surface particles, the greater the degree of creaminess.

Smoothness of a beverage can be attributed to the-presence of small, curved-surface, lubricated particles, which do not become restrained or lodged in the crevices of the tongue during product flow in the oral cavity of the consumer. In contrast, large, ridig particles, particularly with fibrous shapes, bring about the sensations of graininess, pulpiness, and fibrousness. The degree of smoothness is related to the level of frictional resistance to product flow.

The thickness of a beverage is the perception by the consumer of the viscous nature and is dependent on the water-binding capacity of particles, particle-particle interaction and three-dimensional network of particles. Flavour and taste intensities of food products are reduced as the degree of thickness rises with the result of mellowing and blending of the sensations.

The present invention in a certain embodiment provides a formulation and sequential process operations for producing a universal fruit base to which fruit puree(s) and optionally concentrated fruit juice(s) can be added to form beverage concentrates. When the beverage concentrates are diluted with water and/or fruit juice(s), refreshing, creamy, smooth and thick beverages (smoothies) with mellow, blended taste sensations are created. The utilization of this universal fruit base for smoothie production overcomes the limitations and quality defects of commercially-available products, such as:

(1) lack of consistency in smoothness and thickness for various fruit blends of smoothies because of the differences in structural features and functional properties of the particles in the fruit purees and fruit juices; (2) watery consistency; (3) a tendency for particle sedimentation; (4) a dullness of colour; (5) absence of creaminess; and (6) lack of mellow, balanced taste sensations.

In one specific embodiment, this invention relates to the formulation and process for producing universal fruit base comprising an apple mash-polysaccharide mixture, to which fruit puree(s) and optionally concentrated fruit juice(s) can be added to form beverage concentrates. Upon the dilution of these beverage concentrates with water and/or fruit juice (s), supreme, distinctive, refreshing, healthy, creamy, smooth, thick, non-gummy and non-separating fruit beverages (smoothies) are created. These desirable textural characteristics of the resulting beverages can be attributed to the unique specific structure-function relationships of the universal fruit base, namely the apple mash-polysaccharide mixture. The apple mash is unique and consists of predominantly intact single cells along with small cellular aggregates and colloidal pectin micelles.

The novel apple mash is produced by sequential process operations including high temperature treatment of cut apple pieces, and the mechanical impaction on the thermally-treated pieces and screening for the disjoining of cellular particulates in the tissue and for the release of pectin as colloidal micelles. Pregelatinized cross-linked high amylopectin maize starch is added to apple mash to increase the creaminess, smoothness, and thickness through the adsorption of the mucilaginous starch particles to the hydrated, adhesive surfaces of the cellular particulates of the apple mash. Xanthan gum, being cold-water dispersible and having a high water-binding capacity, is added to the apple mash to increase the viscosity of the continuous phase and to interact with the cellular particulates and starch particles and minimize particulate sedimentation during storage of the resulting beverages. This is important because a homogenization step is not required for the particulate stabilization of the resulting beverages.

Ingredients such as yogurt, soy milk, soy protein, coffee, tea, cocoa, spices, natural and artificial flavours, vitamins, minerals, botanicals, and low calorie and carbohydrate sweeteners can be added to the beverage concentrates for flavour, nutritional and health appeal of the resulting beverages. We have discovered that pasteurization and sterilization of the resulting beverages can be carried out without the loss of textural and flavour quality attributes and without particulate destabilization and sedimentation.

A universal fruit base according to this invention is considered to be a comminuted single fruit matrix to which fruit puree(s) and optionally concentrated fruit juice(s) are to be incorporated to form beverage concentrates. These concentrates can be diluted with water and/or fruit juice(s) to create fruit beverages with appealing sensory attributes. The term, "universal", as used herein, implies that the fruit base is to be incorporated as the major fruit ingredient for the production of all varieties and flavour of the resulting beverages (smoothies). It is intended that the unique microstructural and chemical functional features of the universal fruit base be entrenched in all of tile resulting beverages with the benefit of translation into sensory textural attributes of creaminess, smoothness and thickness, and with an attractive creamy appearance.

Some advantages of the universal fruit base are:

(1) use of a single fruit which is available year-round;

(2) consistent carry-through of the structural features and functional properties of the base to elicit highly desirable, uniform, reproducible sensory textural attributes of creaminess, smoothness and thickness of the smoothies, and balanced, mellow blended taste and flavour sensations;

(3) costs-effectiveness and simplicity in the preparation and processing;

(4) a good source of fibre, and presence of phytochemicals such as antioxidants;

(5) compatibility of the universal fruit base with fruit purees and concentrated fruit juices for ease of intermixing and particle-particle interaction; and (6) long-term storage in a frozen, sterilized or pasteurized form without quality deterioration.

The unique universal fruit base is to be produced from apples that are grown and available in various areas of the world. The concept of a universal fruit base is therefore world-wide in application. The inventors have identified a number of criteria for the selection of a suitable fruit as a source of intact single cells and small cellular aggregates for inclusion in a universal fruit base. These are listed as follows:

(1) year-round availability of the fruit;

(2) low to moderate cost of the fruit;

(3) abundance;

(4) presence of small, somewhat-spherical cells in the parenchyma (edible) tissue;

(5) absence of a significant amount of fibrous vascular bundles;

(6) colourless or near colourless parenchyma tissue;

(7) availability of process steps to separate individual intact cells in the parenchyma tissue and to render elasticity and integrity to the protoplasts and walls of intact cells;

(8) mild to bland aroma and flavour;

(9) pH levels between 3.4 and 4.4;

(10) soluble, solids content above 8%;

(11) significant amounts of nutrients, fibre and possibly antioxidants; and

(12) absence or low levels of naturally-occurring surface active compounds.

The criteria set forth above are satisfied by apples, which are abundant and available year-round, have a mild aroma and flavour and relatively low cost, particularly for the cull grade.

The apple is a preferred single fruit which, when processed under specific conditions according to this invention, provides intact single parenchyma cells and small cellular aggregates as functional components of the universal fruit base. The edible apple tissue, (floral tube) consists of oval-like intact cells attached together by middle lamellae pectic substances, called protopectin. Fortunately, a very limited amount of vascular tissue is present in apple tissue. The protoplast of each cell is protected by a thin primary cell wall consisting of cellulose, hemicelluloses, and pectic substances. The diameters of the parenchyma cells range from about 160 to 235 $\mu$m. At harvest, commercial varieties of apples have appreciable amounts of ascorbic acid (5 to 14mg/100g) and soluble solids (11 to 16%) and have about 1% fibre (including a significant level of pectic substances) in the edible tissue. Such apples have pH values between about 3.4 and 3.9.

The edible tissue of apples is colourless or near colourless such as light yellow colour, and thus, with appropriate process steps, a colourless or near colourless universal fruit base can be produced. The advantage of a relatively colourless universal fruit base is that characteristic, representative, attractive bright fruit colours evolve after fruit purees and fruit juices are added to the base for the production of smoothies.

Polyphenols that are present in the apple, may act as antioxidants in the human body to reduce the risk of cancer incidence and atherosclerosis, and as antimicrobial agents to enhance the storability of the smoothies. With active polyphenol oxidase being present in fresh apple tissue, unattractive enzymic browning due to polyphenol oxidation can occur when the intact cells are broken by tissue maceration in a blender or comminutor. Because of such unattractive browning, fresh apple puree has not to date been used as an ingredient in commercially-marketed smoothies. It should be noted that heat-treated, colourless or near colourless apple mash has not been included as an ingredient in commercially-marketed smoothies nor has such apple mash been mentioned in the prior art as a unique functional ingredient for the preparation of smoothies.

With respect to the availability of process steps for rendering elasticity and structural integrity to the protoplasts and walls of intact cells and the disjoining of the intact cells from the parenchyma tissue, the inventors have discovered a series of process operations which achieve the conversion of apple tissue into an intact cellular apple mash that has unique properties that make it ideal for the preparation of a variety of beverages, including smoothies.

Apple tissue does not contain an appreciable amount of surface active compounds as do same fruits such as pineapple, and consequently undesirable foaming does not occur to any appreciable extent during the mixing operations in carrying out the process steps of the invention.

Referring to the schematic flow diagram in FIG. 1, this invention in a specific embodiment pertains to the high-temperature steaming of cut apple pieces which may be derived from whole unpeeled uncored apples, from peeled apples, from cored apples or from peeled cored apples. The benefits of using apple pieces from whole unpeeled uncored apples are: (1) expensive peeling and coring equipment is unnecessary; and, (2) the majority of the apple is used because only seeds, hard carpels and skins are the waste products. The apple pieces are subjected to live culinary steam in a closed system such as a cylindrical chamber with a screw conveyor (eg. Rietz Direct Steam Screw Blancher) in order to increase the temperature of the pieces to at least 100° C. for the purpose of: (1) breaking down the water-insoluble protopectin in the middle lamellae to water-dispersible pectins; (2) inactivating polyphenol oxidase for the prevention of enzymic browning; (3) inactivating other oxidases to inhibit the oxidation of ascorbic acid; (4) gelatinizing the protoplasts to bring about elastic, semi-solid masses in the intact cells; (5) plasticizing the cell walls to enhance extensibility and resistance to impact fractures; and (6) exposing of the adhesive surfaces of intact cells.

Although apple polyphenol oxidase is inactivated in about 9 seconds at a moderately high temperature of 81° C., about 1600 minutes at around the same temperature (76° C.) would be required to solubilize completely the protopectin of the apple. At a temperature of 110° C., only about 2 minutes is required for complete protopectin solubilization in the apple. In this invention, the goal is to maximize the protopectin solubilization in the apple pieces to attain a predominance, of intact single cells in the subsequent apple mash. To achieve this goal with the understanding that a reasonably short steaming time (up to about 8 minutes) is essential, a steam temperature between 100 and 110° C. is required with preference of a temperature between 105 and 110° C. The heat-treated apple tissue must be suitably soft in order to be easily broken down to a mince in a finisher/pulper by paddle impaction and extrusion of the mince through the holes in the screen of a finisher/pulper and subsequently to a mash in a comminutor.

A laboratory sieving test for assessing the effectiveness of a specific time/temperature thermal treatment of apple pieces for producing a suitable apple mash for smoothie production is outlined below:

(1) Steamed apple pieces are to be subjected to screening in a hand-held rotating-paddle sieve (eg. Foley Food Mill) with openings of 2 mm in diameter to produce an apple mince.

(2) Five hundred grams of the resulting apple mince is to be blended in a kitchen 4-blade blender at high speed for 40 seconds. The resulting apple mash with a creamy appearance was found by the inventors to possess intact cellular particulates as observed microscopically.

(3) One hundred grams of the resulting mash is to be mixed with 300 mL of water. The suspension is to be diluted with 2000 mL of water.

(4) The diluted suspension is to be poured onto the top screen of a 3-tier Tyler sieve system with 9, 32 and 48 mesh screens.

(5) The particulate residuals on the screens of the 3-tier Tyler sieve system are to be washed three times with 2000 mL of water each time. Each sieve is to be shaken vigorously to remove excess residual water. The particulate residuals are to be spread evenly over each screen with a spoon.

(6) The separated sieves are to be held for 15 minutes to allow water drainage through each screen.

(7) The bottom of each screen and the body of each sieve is to be dried with absorbent paper towelling.

(8) The wet mass weight is to be determined by the difference in weights between the sieve with wet mass on the screen and the same sieve without the wet mass.

An acceptable time/temperature relationship for the steaming of apple pieces in the production of apple mash can be reached when the maximum wet mass weights are 0.5 grams on the 9 mesh screen, 7 grams on the 32 mesh screen and 9 grams on the 48 mesh screen on the basis of a 100 gram apple mash sample.

According to the invention, the next process step in the sequence following apple steaming is the disjoining of intact single cells and small cellular aggregates, as well as the release of colloidal pectin micelles from the steamed apple tissue by combined mechanical impaction and screening operations involving a finisher/pulper and subsequently a comminutor.

The first impaction operation involves the breakdown of the steamed apple tissue in a finishler/pulper to produce a macerate which is forced through the finisher/pulper screen openings to form an apple mince with the seeds, hard carpel and skin pieces being discarded as waste at the end of the finisher/pulper. The screen opening sizes are preferably from 0.05 to 0.13 inches (1.5 to 3.35 mm), the size being determined by the amount and type of waste, the firmness of the heat-treated apple tissue, the specified flow-through time of the apple macerate in the finisher/pulper and the tolerance level of undesirable foreign particles including seed, hard carpel and skin pieces in the apple mince. Any of these foreign particles in the mince can be removed later by the sieving of the smoothies, as will be detailed in the subsequent section.

In contrast to the use of screens with openings in the vicinity of 0.05 (1.5 mm), the screen openings of around 0.13 (3.35 mm) would be advisable for optimizing the mince yield, for maximising the flow-through of the macerate per unit time and for reducing the waste to a low level with the acceptance of an increase in the tolerance of foreign particles, which would be removed by the sieving of the resulting smoothies. The paddle speed of the finisher/pulper should be at least 1000 rpm to contribute to the optimization of the mince yield and to maximize the flow-through rate of the macerate.

Apple tissue is unique in that some cells are cemented strongly to each other and to vascular bundles. As a consequence, after suitable steaming of apple pieces to soften the tissue through protopectin solubilization and after paddle impaction in a finisher, the resulting mince possesses large cellular aggregates, which are responsible for providing the sensory textural characteristic of graininess. This textural quality of graininess is a desirable attribute for commercial apple sauce. However, for the production of attractive creamy, smooth and thick smoothies, which is an objective of this invention, graininess is to be avoided so the breakdown of the large cellular aggregates by high energy impaction to small cellular aggregates is essential.

The inventors have discovered that using a Tyler sieve having a 48-mesh screen retains the large cellular aggregates which are responsible for the marked graininess of apple mince extruded through a finisher screen. With the openings of the 48-mesh screen being 0.3mm in diameter, the sizes of these aggregates would be about 300 $\mu$m and higher.

The sample laboratory sieving test outlined above without the blending was used to assess the size distribution of grainy aggregates in apple mince. When a 100-gram sample of apple mince with a high level of graininess was suspended in water and was passed through a 3-tier Tyler sieve system with 9, 32 and 48 mesh screens, the following; water-washed, wet mass weights were determined:

| Sieve | Opening | Net Weight, Grams |
| --- | --- | --- |
| 9 mesh screen | 2 mm | 5.1 |
| 32 mesh screen | 0.5 mm | 32.2 |
| 48 mesh screen | 0.3 mm | 14.2 |
| Total weight | | 51.5 |

All of the wet mass fractions had a specific level of sensory graininess, with the 9-mesh fraction having a high level of dry graininess, the 32-mesh fraction having a high level of moist graininess and the 48-mesh fraction having a moderate level of moist graininess. The moistness of the particulates was related to the water-binding capacity.

The second impaction operation according to the invention involves the particle size reduction of the grainy apple mince in a comminutor to maximize the amount of intact single cells (which are important to provide desirable characteristics) and to minimize the amount of cellular aggregates, which are undesirable. The comminutor with impact-edged blades should have screens with openings between about 0.033 to 0.093 inches (0.85 to 2.36 mm) to produce an apple mash with consistency ranging from very smooth to smooth. A FitzMill comminutor (Fitzpatrick company.) was used. The inventors observed by light microscopy that the apple mash (course grind) passing through the screen with 0.093 inch openings possessed larger cellular aggregates than those in the 0.033 inch screened apple mash (fine grind). The medium-grind mash passing through the screen with 0.065 inch openings contained intermediate-size cellular aggregates. In all of the mashes, intact single cells were predominant when considering all types of particulates.

The coarse-grind apple mash was smooth but had a slight grainy texture. The fine-grind apple mash was very smooth and had a very slight grainy texture. The graininess was analyzed by the inventors, and found to be caused by the cellular aggregates which were resistant to breakdown in the FitzMill comminutor. The degree of graininess was related to the size and number of the cellular aggregates in the apple mash.

The inventors have also discovered that when the large particulates were broken down in the apple mince by impaction in the FitzMill comminutor, the appearance advantageously changed from translucent to opaque and creamy due to the increase in light reflection caused by the newly created small particulates.

When the inventors prepared water suspensions of 100-gram samples of fine-grind and coarse-grind apple mashes and passed the suspensions through a 3-tier Tyler sieve system with 9, 32 and 48-mesh screens, the following water-washed wet mass weights were determined:

| Sieve | Openings | Fine-Grind | Coarse-Grind |
| --- | --- | --- | --- |
| 9 mesh screen | 2 mm | 0 grams | 0 grams |
| 32 mesh screen | 0.5 mm | 0.9 grams | 5.9 grams |
| 48 mesh screen | 0.3 mm | 4.9 grams | 4.4 grams |
| Total Weight | | 5.8grams | 10.3grams |

Comparing the results for the apple mince reported previously, and the results for these apple mashes, it is clear that the subsequent step of comminution in a FitzMill comminutor was effective in reducing the sizes and the amounts of the cellular aggregates. It was also noted by the inventors that the size of the openings in a screen of the FitzMill comminutor is a determining factor in the degree of breakdown of the cellular aggregates in the apple mince.

When the inventors prepared a water suspension of a 100-gram sample of medium-grind apple mash and passed the suspension through a 6-tier Tyler sieve system with 9, 32, 48, 60, 80 and 115-mesh screens, the following water-washed wet mass weights were determined:

| Sieve | Opening | Net Weight, Grams |
| --- | --- | --- |
| 9 mesh screen | 2 mm | 0 |
| 32 mesh screen | 0.5 mm | 1.9 |
| 48 mesh screen | 0.3 mm | 7.0 |
| 60 mesh screen | 250 $\mu$m | 21.1 |
| 80 mesh screen | 177 $\mu$m | 23.4 |
| 115 mesh screen | 125 $\mu$m | 2.8 |
| Total Weight | | 56.2 |

It is apparent from these results that the major portions of wet masses were on the 60 and 80-mesh screens. These wet masses, when viewed microscopically, possessed an almost exclusive predominance of intact, single cells (with diameters between 125 and 300 $\mu$m) and very few broken cells, which is a highly desirable and important characteristic: of the invention. The inventors noted that cells with broken off tips retained gel-like protoplasts. Apparently the heat treatment of the apple tissue brought about gelatinization of the protoplasts and the plasticizing of the primary cell walls. These wet masges were very smooth in terms of sensory texture. Only about 16% of the total wet mass weight of the medium-grind mash was represented by the grainy cellular aggregates on 32 and 48-mesh screens.

The inventors have also discovered, with the aid of light microscopy, that the intact single cells of apple mash had adhesive surfaces and tended to adhere to each other and to form multicellular particulates (agglutination). However, the bonding between the cells was determined to be weak as demonstrated by the disengagement of adhering cells by exerting slight pressure on a cover glass over the mash on a microscopic glass slide, when observing the mash through the microscope. The moderately high inherent viscosity of the resultant apple mash can be attributed to this cellular adhesion phenomenon as well as the jostling of the hydrated particulates. The adhesive surfaces of the cellular particulates are desirable sites for adsorption of hydrated particles of fruit purees and fruit juices, of modified starch particles, of macromolecules of xanthan gum and of protein micelles.

The inventors have further discovered, with the aid of light microscopy, that colloidal pectin-containing micelles were present in the continuous aqueous phase of the apple mash. When 3 parts of 2-propanol were added to 1 part of a cell-free filtrate (continuous phase) of a water-diluted mash (1 part mash to 3 parts water), flocculation occurred initially and gradually a gelatinous mass formed. The mass, examined microscopically, consisted of parallel-oriented rope-like strands. Apparently the alcohol caused a dehydration effect of the hydrated micelles to bring about agglomeration and strand formation. The hydrated pectin micelles are regarded by the inventors as a desirable viscosity enhancer of the continuous phase and as a valuable soluble fibre source in the diet. Further, the micelles may be involved in the interaction with xanthan gum macromolecules and adsorbing aroma volatiles with the benefit of inhibiting flavour loss during pasteurization or sterilization of the smoothies.

Since smoothies are to be prepared with around 30% to 45% apple mash by weight, a study was carried out to examine the suspension stability of water-diluted mash. When dispersions of 1 part apple to 2 parts of water by volume were held at 3° C. and 22° C. for 24 hours, supernatant layers of about 60 and 50%, respectively of the total volume of the dispersions were formed because of synthesis. The particulates in the subnatants were uniformly suspended and no particulate agglomerates were found at the bottom of the containers. It was evident that the hydrated particulates had to be stabilized by some means so that they remained in suspension in resulting smoothies without supernatant formation during extended storage periods at temperatures between 0 and 30° C. The inventors have discovered that the adhesion of cellular particulates (agglutination) accounted in part for the particulate sedimentation in the water-diluted apple mash. Modulation of the agglutination of cellular particulates by physical obstruction with particles of modified starch and xanthan gum adsorbed to the adhesive surfaces of the particulates were found to be advantageous for suspension stability.

A principal characteristic of the invention is that, upon the addition of pregelatinized cross-linked high amylopectin maize starch (modified starch) to apple mash, the viscosity increases appreciably. The starch particles act as appendages to the intact single cells for modulating cell agglutination and act as bridges between intact single cells and cellular aggregates to create smoothness, viscosity buildup and creaminess.

Further, the invention demonstrates that the modified starch adheres strongly to the grainy cellular aggregates to form gelatinous surfaces with the advantage of relatively unresisted flow of the aggregates over the tongue and the diminution of the sensory graininess to a level of insignificance. The added beneficial features of the modified starch are: (1) ease of dispersion and hydration in apple mash at ambient temperatures; (2) neutral aroma and flavour; (3) white appearance; and (4) adhesive, mucilaginous surfaces.

As a further aspect of the invention, xanthan gum can be added to the apple mash to increase the viscosity of the continuous phase and to interact with the modified starch particles and cellular particulates with the object of restricting particle sedimentation during the storage of the resulting smoothies. As detailed below, the mixing of xanthan gum with modified starch as a dilutant carrier is advantageous for preventing the formation of gummy xanthan agglomerates when introduced into an agitated apple mash. The added features of xanthan gum with benefits for this invention are: (1) ease of dispersion and hydration in apple mash at ambient temperatures; (2) high water-binding capacity; (3) viscosity of the gum dispersion decreases with shear rate increase; (4) non-slimy mouthfeel; (5) interaction with modified starch particles and cellular particulates; (6) heat stability; and (7) thermal stability.

The effectiveness of small amounts of the modified starch and xanthan gum as ingredients for increasing the apparent viscosity of the apple mash is presented as follows:

| Product | | Apparent Viscosity, Poises at 21° C. |
|---|---|---|
| 1. Apple mash | | 145 |
| 2. Apple mash | + 1.5% modified starch | 279 |
| 3. Apple mash | + 1.5% modified starch + 0.23% xanthan gum | 510 |

A Brookfield Viscometer Model RVT with a No. 4 spindle and a rotation of 2.5 rpm was used to measure the apparent viscosity of the above-mentioned samples.

The incorporation of modified starch and xanthan gum into apple mash without the formation of large gummy agglomerates is a critical and important step in the production of a creamy, smooth and thick universal fruit base.

The inventors have further discovered that when granulated sugar (sucrose) is added to the modified starch-xanthan mixture (2 to 5 parts of sugar to 1 part of mixture), the modified starch and xanthan gum are dispersed uniformly throughout the moderately-agitated apple mass in a mixer without the formation of gummy agglomerates. Other fillers such as powdered dextrose, maltodextrin and corn syrup solids may be used in place of sugar.

The inventors discovered that when no carbohydrate filer is to be added, the mixing of xanthan gum with modified starch as a dilutant carrier is advantageous for preventing the formation of gummy xanthan agglomerates when introduced into a highly agitated apple mash in a mixer.

The inventors have ascertained that the invention possesses the following preferred parameters. The amount of wet particulate mass for apple mash should be from 35 and 75% by weight, preferably from 45 to 75% by weight. The level of water condensate in the steamed apple tissue is a determinant in the % wet particulate mass and thus must be controlled.

The amount of pregelatinized cross-linked high amylopectin starch (modified starch) to be added to the apple mash should be between 1.0 and 3.0% by weight, preferably between 1.2 and 2.0% by weight. The amount of xanthan gum to be added to the apple mash should be between 0.14 and 0.40% by weight, preferably between 0.20 and 0.30% by weight.

In summary, the unique and inventive features of the universal fruit base prepared with apple mash and polysaccharides according to the invention are as follows:

(1) The mash has oval-like intact single cells whose curved configurations contribute to the creaminess and smoothness of the base and the resulting smoothies.

(2) The hydrated, adhesive surfaces of intact single cells are involved in the cell-cell adhesion which is modulated by the adherence of modified starch particles to the cell surfaces. These interactions lead towards a viscous, thick base with carry through functional properties to the smoothies.

(3) The cellular aggregates, with strongly adsorbed modified starch particles, have hydrated, gelatinous surfaces which have the advantage of repressing the grainy sensation of the cellular aggregates in the base and in the resulting smoothies.

(4) The highly hydrated macromolecules of xanthan gum, some being in the continuous phase as unattached species, and some being adsorbed to the starch moieties and cellular particulates, contribute to the increase in viscosity of the base and stabilization of cellular particulates as non-sedimenting, suspended functional components in the base and in the resulting smoothies.

(5) Colloidal pectin micelles are released during the disjoining of cellular particulates and contribute to the viscous property of the continuous phase and stability of the cellular particulates, and possibly to the retention of the original fruit flavour during pasteurization or sterilization. The pectin micelles are a source of soluble dietary fibre.

(6) Naturally-occurring nutrients such as ascorbic acid and minerals, modified starch as a complex carbohydrate, xanthan gum as a soluble dietary fibre and phytochemicals are benefits for a healthy diet.

The invention includes the creation of a universal fruit base as a three-dimensional particulate continuum matrix, which accomnmodates fruit puree(s) and optionally concentrated fruit juice(s) to form beverage concentrates.

The inventors have classed the beverage concentrates as follows:

Class A: Universal fruit base admixed with fruit puree(s) and concentrated fruit juice(s) to form beverage concentrates which are to be subsequently diluted with water and/or fruit juice(s). The fruit juices may be freshly-squeezed, not from concentrate and/or reconstituted products.

Class B: Universal fruit base admixed with fruit puree(s) to form beverage concentrates, which are to be subsequently diluted with fruit juice(s). The fruit juices may be freshly-squeezed, not from concentrate and/or reconstituted products.

The Class A and B beverage concentrates are versatile and may be mixed with protein systems such as yogurt, soy milk and milk, with vitamins and minerals, with phytochemicals and nutraceuticals, with flavourants such as natural fruit flavours and spices, with cocoa and coffee products and with low-calorie and carbohydrate sweeteners.

The beverage concentrates are to contain fruit puree(s) at appropriate levels to provide natural pigments, sugars and characteristic flavours as quality attributes of the resulting smoothies and to provide nutrients and fibre as nutritional attributes of the resulting smoothies. The fruit purees may be mango, banana, peach, apricot, strawberry, pineapple, and papaya as examples. When a puree as the minor ingredient is intermixed with the base, it is spread evenly throughout the apple three-dimensional continuum particulate matrix. Particles of some purees such as mango interface with apple mash particulates to enhance the viscosity. Generally, 10 to 30% by weight of the apple mash as fruit puree(s) is to be admixed with the universal fruit base to provide desirable quality attributes, and nutrients and fibre.

The beverage concentrates can optionally contain concentrated fruit juices at appropriate levels to provide natural pigments, sugars and characteristic flavours as quality attributes of the resulting smoothies and to provide nutrients and fibre as nutritional attributes of the resulting smoothies. The concentrated fruit juices may be passion fruit, orange, pineapple, apple, berry and grapefruit as examples. The concentrates intermix readily with the apple mash having added puree(s). Generally, 0 to 40% by weight of the apple mash as concentrated fruit juice(s) is to be admixed with the universal fruit base, the percentage being dependent on whether water or a mixture of water and juice(s) or juice(s) is to be incorporated as a diluent. Ingredients such as yogurt, soy milk, soy protein, milk protein, milk, coffee, tea, cocoa, spices, natural and artificial flavours, vitamins, minerals, botanicals, and low-calorie and carbohydrate sweeteners may be added to the beverage concentrates for flavour, nutritional and health appeal of the resulting beverages.

The beverage concentrates can be diluted with water and/or fruit juice(s) to the extent that the apparent viscosity of the resulting smoothies is between 300 and 900 centipoises at 3° C. as determined with a Brookfield Model RVT with a No. 2 spindle and rotation of 20 rpm. Fruit juice(s) may be freshly-squeezed, not from concentrate and/or reconstituted products and may be uncarbonated or carbonated. Orange juice, grapefruit juice, apple juice, pineapple juice, berry-type juices and lemon juice, as examples, may be used as diluents for the beverage concentrates. The water may be spring, mineral or municipal types or any other types, and may be uncarbonated or carbonated.

When the universal fruit base comprising apple mash according to the invention is used to make a smoothie, the inventors have discovered that the apparent viscosity of the resulting smoothies decreased as the temperature rose from 3° C. to 81° C. The temperature effect on the apparent viscosity of a mango passion fruit smoothie is shown as follows:

| Temperature of Smoothie, ° C. | Apparent Viscosity, centiPoises |
| --- | --- |
| 3 | 504 |
| 10 | 446 |
| 18 | 390 |
| 21 | 350 |
| 24 | 302 |
| 45 | 216 |
| 81 | 116 |

A Brookfield Viscometer Model RVT with a No. 2 spindle and a rotation of 20 rpm was used to measure the apparent viscosity of the mango-passion fruit smoothie mentioned above.

Since smoothies prepared with the universal fruit base are to be consumed as cooled beverages in the vicinity of 3 to 10° C., the viscosity differences at temperatures within this range should be limited. As such, differences in sensory thickness of the smoothies would be essentially insignificant. The smoothies, prepared according to the specifications of this invention, possess structure-function properties, which restrict dramatic viscosity changes with low temperature fluctuations. The above Table for the mango passion fruit smoothie shows a drop in apparent viscosity of only 58 centipoises with an increase in temperature from 3 to 10° C.

At pasteurization and sterilization temperatures of 80° C. and higher, the apparent viscosity of the smoothies, prepared in accordance with the specifications of this invention, is relatively low and thus turbulent flow in a heat exchanger would be expected for efficient heat transport into the smoothies. For the mango passion fruit smoothie, as indicated above, the apparent viscosity decreased from 504 centipoises at 3° C. to a relatively low value of 116 centipoises at 81° C.

To remove any undesirable foreign particles and large fibrous vascular bundles, the resulting smoothies can be passed through a sieve with a screen having openings of between 1.0 to 1.4mm. The inventors have found that the resulting smoothies flow through a 1.0 mm sieve at a rapid rate. With such sieving, pieces of skin, seeds, hard carpel, fibrous vascular bundles and brown-coloured tissue will remain on the screen.

Dissolved air and air bubbles in the smoothies should be obviated as much as possible in order to minimize the oxidation of ascorbic acid and pigments such as carotenoids during the storage of the packaged products. Since apple mash particulates are, for the most part, oval-like in configuration, gas bubbles have a tendency to rise at a moderately rapid rate in smoothies held at ambient temperature. Further, air incorporation into beverage concentrates and smoothies can be limited by the use of low-speed agitators for mixing. Deaeration of smoothies may be carried in a vacuum chamber (15 to 20 inches Hg) when the product temperature is at around 20 to 25° C. or when preheated product temperatures are up to about 50° C.

Thermal inactivation of microorganisms and enzymes in the smoothies is essential to reduce, inhibit or prevent quality deterioration over extended storage periods at refrigerated temperatures or at ambient temperatures. The inventors have ascertained that heat treatment of smoothies at temperatures between 85 and 90° C. for 20 to 60 seconds can inactivate microorganisms and enzymes and render the products commercially sterile. To preserve the fruit flavour of the smoothies, the heated products must be cooled rapidly to at least 37° C. and preferably 30° C. and below. Plate and tubular heat exchangers with cooling sections are recommended for efficient and effective sterilization of products to be stored at refrigerated temperatures and of aseptically packaged products to be stored at ambient temperatures.

The sterilized-cooled smoothies may be packaged in water-washed plastic containers for storage at refrigerated temperatures (1 to 8° C.) with the understanding that the level of microbial contamination in the containers and caps will determine the shelf life of the products. The sterilized-cooled smoothies can be packaged in laminated cartons under aseptic processing conditions.

The inventors have determined that hot sterilized smoothies at 88 to 90° C. may be introduced into glass containers whereupon, after capping, each container is inverted for 3 minutes to sterilize the cap. Thereafter, the containers are immersed in cooling water to bring down the temperature to at least 37° C.

It has been discovered that the resulting smoothies, either pasteurized, sterilized or non-thermally treated, can be preserved in the frozen form at temperatures below −5° C. for extended storage periods without loss of the quality and nutritional attributes. The thawed smoothies possess the same creamy, smooth and thick characteristics as do the unfrozen smoothies. In addition, the thawed smoothies have no particle sedimentation and no visible layering. Freezing does not have any deleterious effect on the attractive qualities of the smoothies.

The quality of the resulting smoothies is such that they mask the unpalatable sourness-bitterness of added multivitamins and minerals in concentrations high enough to satisfy the recommended daily allowances or recommended daily levels in a 250 mL serving. It has also been discovered that fruit shakes may be prepared by subjecting the smoothies to high-speed agitation in a blender for the incorporation of air to form the foamy products.

The smoothies prepared with the universal fruit base under the conditions of this intention are exceptional and have the following desirable quality attributes:

(1) a high content of macerated whole fruit;
(2) a creamy, smooth, thick, non-gummy consistency;
(3) a refreshing, rich fruity flavour;
(4) a mellow, balanced taste sensation;
(5) bright natural fruit colours;
(6) a creamy appearance;
(7) non-sedimenting particles during prolonged storage;
(8) foamability by high-speed agitation in a blender to form fruit shakes;
(9) appreciable amounts of nutrients, fibre and phytochemicals;
(10) thermal stability without significant loss of textural, flavour and colour attributes;
(11) freezing stability without loss of quality and nutritional attributes;
(12) uniform distribution of protein particles entrapped in the apple particulate matrix when either yogurt or soy milk is added;
(13) ease of escape of gas bubbles suspended during ingredient mixing; and
(14) off-flavour masking of added multivitamin and mineral mixtures and nutraceuticals.

SPECIFIC ILLUSTRATIONS OF METHODS FOR PREPARING SMOOTHIES WITH THE UNIVERSAL FRUIT BASE

EXAMPLE 1

1. Preparation of the Universal Fruit Base for a Mango-Passion Fruit Smoothie A mixture of 31 grams of modified starch, 4.5 grams of xanthan gum and 200 grams of granulated sugar was sifted twice through a sieve with 1 mm openings to ensure even distribution of the starch and gum particles in the sugar. The mixture was added to 2000 grams of apple mash (10% soluble solids) which was stirred by a mechanical mixer having a whisk attachment rotating at a moderate rate. The apple mash consisted of 69% by weight of total wet mass. The resulting universal fruit base was held at ambient temperature for about 15 minutes to ensure adequate hydration of the starch and gum particles.

2. Preparation of Mango-Passion Fruit Smoothie

To 22,35 grams of universal fruit base, 250 grams of mango puree, 110 grams of passion fruit concentrate (50° Brix), 825 grams of concentrated orange juice (42° Brix) and 23 grams of natural mango flavour were added with stirring with a slow-speed rotating whisk attachment on a mechanical mixer. The resulting beverage concentrate was diluted with 2700 grams of municipal water by pouring the beverage concentrate into agitated water. After thorough mixing, the resulting smoothie was passed through a sieve with 1 mm openings to remove pulpy particles and undesirable apple pieces.

The batch of smoothie was pasteurized at 80° C. for 20 seconds in a tubular heat exchanger. After the smoothie was cooled rapidly (about 20 seconds) to about 7 to 10° C., the product was filled into 250 mL polyethylene bottles, capped immediately and stored at 3° C.

The apparent viscosity of the product was 448 centipoises at 3° C. as measured with a Brookfield Viscometer Model RVT with a No. 2 spindle and a rotation of 20 rpm. The % soluble solids of the mango-passion fruit smoothie was 14.6 and the pH was 3.68.

The sensory quality attributes of the smoothie included a bright yellow, creamy appearance, a smooth, creamy, moderately thick, non-grainy texture, a pleasant blend of mango, passion fruit and orange flavours, and a mellow sweetness/ sourness interrelation. During the storage of the smoothie at 3°, no settling or layering was noted over a 30 day period.

The mango-passion fruit smoothie consisted of 32.5% apple mash.

EXAMPLE 2

1. Preparation of the Universal Fruit Base for Cranberry-Apple Smoothie

A mixture of 31 grams of modified starch, 5.0 grams of xanthan gum, and 250 grams of granulated sugar was sifted twice through a sieve with 1 mm openings to ensure even distribution of the starch and gum particles in the sugar. The mixture was added to 2300 grams of apple mash (10% soluble solids) which was stirred by a mechanical mixer having a whisk attachment rotating at a moderate rate. The apple mash consisted of 69% by weight of total wet mass. The resulting universal fruit base was held at ambient temperature for about 15 minutes to ensure adequate hydration of the starch and gum particles.

2. Preparation of Cranberry-Apple Smoothie

To 2.586 grams of universal fruit base, 240 grams of concentrated cranberry juice (50° Brix), 825 grams of concentrated apple juice (38° Brix), 16 grams of concentrated blueberry juice (65° Brix) and 10 grams of concentrated black raspberry juice (50° Brix) were added with stirring by a slow-speed rotating whisk attachment on a mechanical mixer. The resulting beverage concentrate was diluted with 2700 grams of municipal water by pouring the beverage concentrate into the agitated water. After thorough mixing, the resulting smoothie was passed through a sieve with 1 mm openings to remove any large pulp particles and undesirable apple pieces.

The batch of smoothie was pasteurized at 83° C. for 20 seconds in a tubular heat exchanger. After the smoothie was cooled rapidly (about 20 seconds) to about 7 to 10° C., the product was filled into 250 mL polyethylene bottles, capped immediately and stored at 3° C.

The apparent viscosity of the product was 535 centipoises at 3° C. as measured with a Brookfield Viscometer Model RVT with a No. 2 spindle and a rotation of 20 rpm. The % soluble solids of the cranberry-apple smoothie was 15.0 and the pH was 3.10.

The sensory quality attributes of the smoothie included a bright red, creamy appearance, a smooth, creamy, moderately thick, non-grainy texture, a pleasant blend of cranberry and apple flavours, and a typical cranberry sourness. During the storage of the smoothie at 3° C., no settling or layering was noted over a 30 day period.

The cranberry-apple smoothie consisted of 36.1% apple mash.

When the cranberry-apple smoothie was frozen at −18° C. for about 24 hours and thawed at ambient temperature, no settling or layering was noted. The apparent viscosity of the product was 530 centipoises at 3° C. as measured with a Brookfield Viscomoter Model RVT with a No. 2 spindle and a rotation of 20 rpm. The sensory quality attributes of the thawed product were similar to those for the unfrozen samples.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process of producing a non-frozen universal fruit base from apples suitable for the production of a smooth apple-based fruit beverage which comprises:
   (a) washing and sanitizing the apples;
   (b) cutting, the apples into pieces;
   (c) cooking the apple pieces with steam of a temperature between 100° C. and 110° C. for about 2 to about a minutes got the steam breaks down the water-insoluble protopectin in the middle lamellae of the apple to water-dispersible pects, inactivates polyphenol oxidase in the apple for the prevention of enzymic browning, inactivates other oxidases in the apple to inhibit the oxidation of ascorbic acid, gelatinizes the protoplasts in the apple to bring about elastic, semi-solid protoplasts in the intact apple cells, plasticizes the apple cell walls to enhance extensibility and resistance to impact fractures, and exposes the adhesive surfaces of intact apple cells;
   (d) macerating and screening the cooked apple pieces with a finisher/pulper having screen openings between about 0.05 and 0.13 inches to produce an apple mince;
   (e) comminuting the apple mince with a comminutor having screen openings between about 0.033 and 0.093 inches to produce an apple mash having predominantly intact single cells;
   (f) adding a pregelatinized cross-linked high amylopectin maize starch and xanthan gum to the apple mash to produce a universal fruit base;
   (g) adding fruit puree(s) and optionally concentrated fruit juice(s) to the universal fruit base to form a beverage concentrate; and
   (h) adding, water and/or fruit juice(s) to the beverage concentrate to produce a smooth apple-based fruit beverage.

2. A process according to claim 1 wherein fruit puree(s) are added to the universal fruit base to form the beverage concentrate, and waiter is added to the beverage concentrate to produce a smooth apple-based fruit beverage with a viscosity between 300 and 900 centipoise at 3° C.

3. A smooth apple-based fruit beverage produced according to the process of claim 2.

4. A process according to claim 1 wherein the apple is washed with a chlorinated water or other types of disinfected waters.

5. A process according to claim 1 wherein the maceration and screening of steamed, cooked apple pieces in a finisher/pulper produces apple mince without appreciable amount of foreign particles such as seed, hard carpel and skin pieces.

6. A process according to claim 1 wherein the total amount of wet particulate mass for the apple mash is between 35 and 75% by weight.

7. A process according to claim 1 wherein the amount of pregelatinized cross-linked high amylopectin maize starch added to the apple mash is between 1.0 and 3.0% boy weight.

8. A process according to claim 7 wherein the amount of starch added to the apple mash is between 1.2 and 2.0% by weight.

9. A process according to claim 1 wherein the amount of xanthan gum added to the apple mash is between 0.14 and 0.40% by weight.

10. A process according to claim 9 wherein the amount of xanthan gum added to the apple mash is between 0.20 and 0.30% by weight.

11. A universal fruit base produced according to the process of claim 1.

12. A process according to claim 1 wherein the total amount of wet particulate mass for the apple mash is between 45 and 75% weight.

13. A process according to claim 1 wherein 2 to 5 parts sucrose is added to 1 part starch, xanthan gum and apple mash in step (f).

14. A process according to claim 1 wherein an acceptable time/temperature relationship for the steaming of apple pieces in claim 1 (c) is when the maximum wet mass weights are 0.5 grams on a 9 mesh screen, 48 mesh screen on the basis of a 100 gram apple mash sample.

15. A process of producing a nonfrozen universal fruit base from apples suitable for the production of a smooth apple-based fruit beverage which comprises:
   (a) washing and sanitizing the apples;
   (b) cutting, the apples into pieces;
   (c) cooking the apple pieces with steam of a temperature between 100° C. and 110° C. for about 2 to about 8 minutes so that the steam breaks down the water-insoluble protopectin in the middle lamellae of the apple to water-dispersible pectins, inactivates polyphenol oxidase in the apple for the prevention of enzymic browning, inactivates other oxidases in the apple to inhibit the oxidation of ascorbic acid, gelatinizes the protoplasts in the apple to bring about elastic, semi-solid protoplasts in the intact apple cells, plasticizes the apple cell walls to enhance extensibility and resistance to impact fractures, and exposes the adhesive surfaces of intact apple cells;
   (d) macerating and screening the cooked apple pieces with a finisher/pulper having screen openings between about 0.05 and 0.13 inches to produce an apple mince;
   (e) comminuting the apple mince with a comminutor having screen openings between about 0,033and 0.093 inches to produce an apple mash having predominantly intact single cells, and
   (f) adding a pregelatinized cross-linked high amylopectin maize starch and xanthan gum to the apple mash to produce a universal fruit base.

16. A process according to claim 15 wherein concentrated fruit juices are added to the universal fruit base to form a beverage concentrate.

17. A process according to claim 16 wherein fruit juice is added to the beverage concentrate.

* * * * *